United States Patent
Barzik et al.

(10) Patent No.: US 10,698,618 B1
(45) Date of Patent: *Jun. 30, 2020

(54) USER-DEFINED FAILURE DOMAINS FOR SOFTWARE-DEFINED STORAGE SYSTEMS

(71) Applicant: INTERNATIONAL BUSINESS MACHINES CORPORATION, Armonk, NY (US)

(72) Inventors: Zah Barzik, Rishon Lezion (IL); Lior Chen, Tel Aviv (IL); Michael Keller, Haifa (IL); Rivka M. Matosevich, Tel Aviv (IL)

(73) Assignee: INTERNATIONAL BUISNESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/365,419

(22) Filed: Mar. 26, 2019

(51) Int. Cl.
*G06F 12/00* (2006.01)
*G06F 3/06* (2006.01)
*G06F 11/07* (2006.01)

(52) U.S. Cl.
CPC ............ *G06F 3/0629* (2013.01); *G06F 3/067* (2013.01); *G06F 3/0619* (2013.01);
(Continued)

(58) Field of Classification Search
CPC ...... G06F 3/067; G06F 3/0689; G06F 3/0629; G06F 3/0631; G06F 3/0632;
(Continued)

(56) References Cited

U.S. PATENT DOCUMENTS 7,092,977 B2 * 8/2006 Leung .................. G06F 16/13
7,487,308 B1    2/2009 Dalal
(Continued)

FOREIGN PATENT DOCUMENTS

CN         104754001 A      7/2015

OTHER PUBLICATIONS

Alba et al. "Efficent and Agile Storage Management in Software Defined Environments" IBM Journal of Research and Development, vol. 58, No. 2/3, Paper 5, Mar./May 2014 (12 Pages).
(Continued)

*Primary Examiner* — Shawn X Gu
(74) *Attorney, Agent, or Firm* — Griffiths & Seaton PLLC

(57) ABSTRACT

Methods, computing systems and computer program products implement embodiments of the present invention that include defining a plurality of failure domains for sets of storage devices in a storage facility, and defining, using the failure domains, one or more limitations for distributing data on the storage devices. Upon identifying a data distribution configuration for a software defined storage system that is compliant with the one or more limitations, the identified data distribution configuration can be presented to a user. The failure domains may include physical failure domains, logical failure domains, or a combination of physical and logical failure domains, and the limitations may include mandatory limitations or a combination of mandatory and non-mandatory limitations. In embodiments including non-mandatory limitations, the data distribution configuration may not comply with all the non-mandatory limitations, and any non-mandatory limitations that are not met can be flagged and presented to the user.

14 Claims, 5 Drawing Sheets

(52) U.S. Cl.
CPC .......... *G06F 3/0647* (2013.01); *G06F 3/0659* (2013.01); *G06F 11/0709* (2013.01); *G06F 11/0727* (2013.01); *G06F 11/0751* (2013.01); *G06F 11/0793* (2013.01)

(58) Field of Classification Search
CPC ............. G06F 3/0655; G06F 12/30575; G06F 12/30584; G06F 11/2053; G06F 11/2094; H04L 41/0803; H04L 41/0806; H04L 41/0813; H04L 41/0889; H04L 41/0823; H04L 41/08; H04L 41/0836; H04L 67/10; H04L 67/1097

See application file for complete search history.

(56) References Cited

U.S. PATENT DOCUMENTS

| | | | |
|---|---|---|---|
| 8,589,560 | B1 | 11/2013 | Liu |
| 8,880,930 | B2 | 11/2014 | Ahmad et al. |
| 2004/0123030 | A1 | 6/2004 | Dalal |
| 2006/0075191 | A1 | 4/2006 | Lolayekar |
| 2006/0236061 | A1 | 10/2006 | Koclanes |
| 2007/0022129 | A1* | 1/2007 | Bahar .................... G06F 9/5011 |
| 2008/0301255 | A1* | 12/2008 | He ........................ G06F 3/0605 709/214 |
| 2012/0303736 | A1* | 11/2012 | Novotny ............. H04L 67/2809 709/213 |
| 2013/0159637 | A1 | 6/2013 | Forgette |
| 2013/0290295 | A1 | 10/2013 | Soules et al. |
| 2015/0010012 | A1 | 1/2015 | Koponen et al. |
| 2015/0312243 | A1* | 10/2015 | Ponsford ............. G06F 21/6218 713/159 |
| 2016/0011816 | A1 | 1/2016 | Aizman |
| 2016/0014202 | A1 | 1/2016 | Umbehocker |
| 2016/0306581 | A1 | 10/2016 | Belgaied |
| 2017/0147458 | A1 | 5/2017 | Epstein |

OTHER PUBLICATIONS

Abdelbaky et al. "A Framework for Realizing Software-Defined Federations for Scientific Workflows" Big System 15 ACM, pp. 7-14, Jun. 16, 2015 (8 Pages).

Nicolas, "Scality RING: Software Defined Storage for the 21st Century," Scality, White Paper, 2014 (36 Pages).

* cited by examiner

USER-DEFINED FAILURE DOMAINS FOR SOFTWARE-DEFINED STORAGE SYSTEMS

CROSS-REFERENCE TO RELATED APPLICATIONS

The present Application is a Continuation of U.S. patent application Ser. No. 15/062,601, filed on Mar. 7, 2016, now U.S. Pat. No. 10,289,502, the contents thereof incorporated herein by reference in their entirety.

FIELD OF THE INVENTION

The present invention relates generally to software-defined storage (SDS), and specifically to a method for utilizing user-defined failure domains to configure an SDS system.

BACKGROUND

In software-defined computing (SDC), a computing infrastructure is virtualized and delivered as a service. For example, in a software-defined storage (SDS) system storage hardware is separated from software that manages the storage infrastructure. In SDS, the software managing a software-defined storage environment may also provide policy management for features such as deduplication, replication, thin provisioning, snapshots and backup. By definition, SDS software is separate from the hardware it is managing, and can be implemented via appliances over a traditional Storage Area Network (SAN), or implemented as part of a scaled-out Network-Attached Storage (NAS) solution, or as the basis of an Object-based storage solution.

The description above is presented as a general overview of related art in this field and should not be construed as an admission that any of the information it contains constitutes prior art against the present patent application.

SUMMARY

There is provided, in accordance with an embodiment of the present invention a method, including defining a plurality of failure domains for sets of storage devices in a storage facility; defining, using the failure domains, one or more limitations for distributing data on the storage devices; wherein the one or more limitations are defined within a plurality of layers arranged in a hierarchal order of importance such that one or more limitations defined in a higher one of the plurality of layers represents one or more mandatory limitations and one or more limitations defined in a lower one of the plurality of layers represents one or more non-mandatory limitations; identifying a data distribution configuration for a software defined storage system that is compliant with the one or more limitations according to the plurality of layers arranged in the hierarchal order of importance such that a prospective manner in which the data is distributed on the storage devices is determined that conforms to the defined one or more limitations and complies with the defined failure domains; wherein the identifying further includes considering forfeiting an implementation of the one or more non-mandatory limitations which are not able to be met when implementing the one or more mandatory limitations commensurate with complying with the defined failure domains; and distributing the data among the storage devices to implement the identified data distribution configuration according to the one or more limitations of the failure domains.

Additional system and computer program product embodiments are disclosed and supply related advantages.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
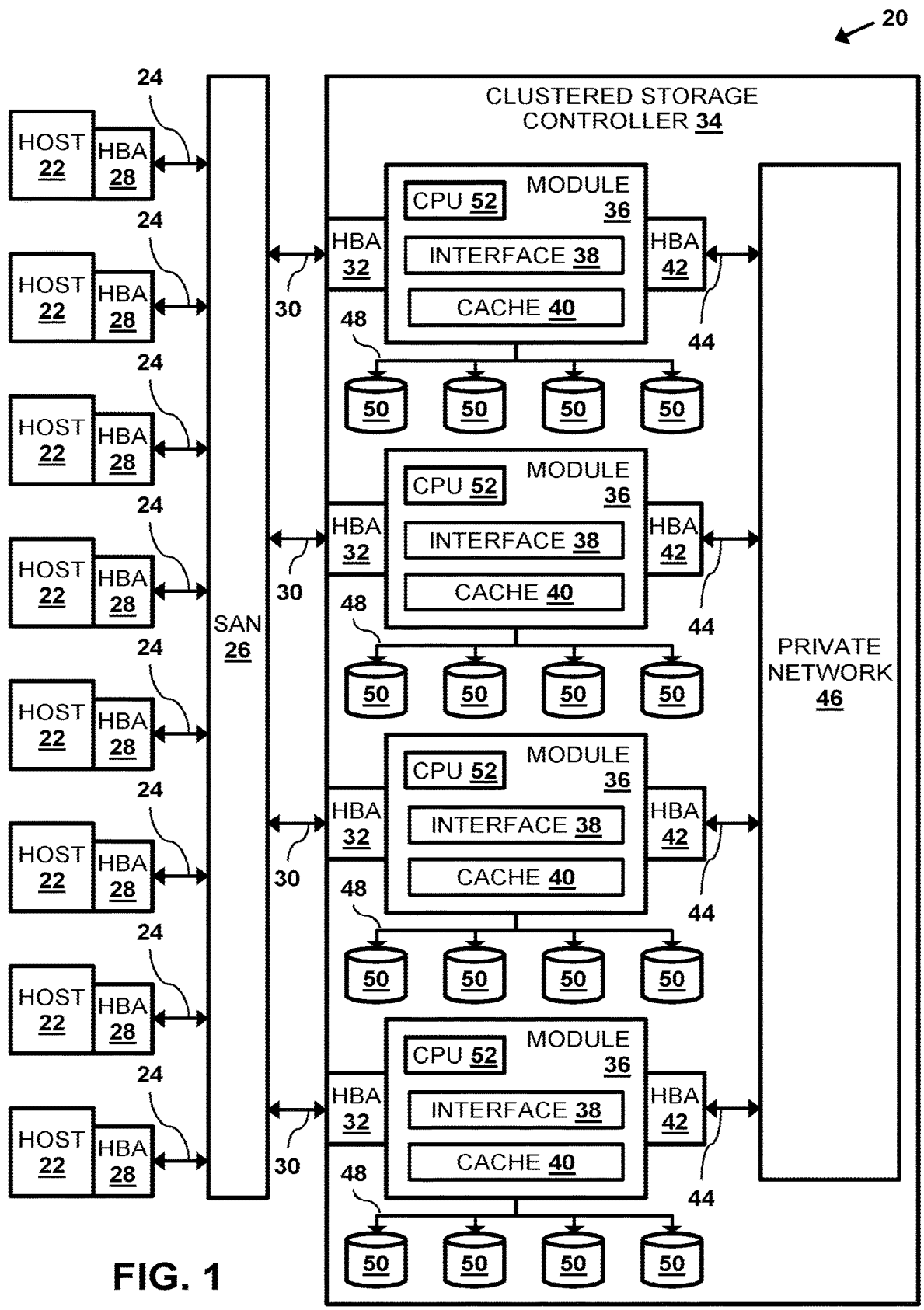
FIG. 1 is a block diagram that schematically illustrates a storage controller having multiple modules configured to store data, in accordance with an embodiment of the present invention.

Software defined storage (SDS) systems are typically implemented on a set of underlying servers which may be physically reliant on shared components and/or a shared infrastructure. Examples of components and infrastructure include the servers, universal power supplies (UPSs), power grids, network switches and server racks. Additionally, some hardware devices may be more prone to common failures. For example components such as servers that are supplied by a single vendor may be vulnerable to the same firmware bugs.

When a subset of the servers shares one or more vulnerabilities, "failure domains" can be defined in order to reduce the risk that a single point of failure will cause data loss. Failure domains can be used to help configure distributed data systems so that redundant copies of identical data are not stored on components belonging to the same failure domain. For example, a failure domain-based configuration rule may comprise not storing two copies of the same data on servers which are connected to the same UPS.

When configuring an SDS system, a system administrator may be required to perform extensive planning in order to account for failure domains. This may result in cases where the initial planning done by the system administrator leads to low utilization of the SDS system's available capacity. On the other hand, failing to properly account for the failure domains may result in a higher risk for data loss.

Embodiments of the present invention provide systems and methods for defining limitations for data distribution having one or more different importance levels, and defining a configuration for an SDS system that complies with the defined limitations. As explained hereinbelow, a plurality of failure domains can be defined for sets of storage devices in a storage facility, and using the failure domains, one or more limitations can be defined for distributing data on the storage devices. Upon identifying a data distribution configuration for a software defined storage system that is compliant with the one or more limitations, the data distribution configuration can be presented to a user (e.g., a system administrator). In some embodiments, the user can also be notified if no data distribution configuration can be identified that complies with the one or more limitations.

Systems implementing embodiments of the present invention can implement a layered mechanism for calculating the distribution of data according to the failure domains defined by the user. The layers (i.e., importance levels) can be defined hierarchically, and the system would produce the best available distribution considering the limitations provided by the user. These layers may infer a "price" that the user is willing to pay in order to comply with a certain limitation.

For example, the price may be defined as an amount of storage capacity that the user is willing to forfeit in exchange for complying with an additional failure domain derived limitation for the data distribution. In such cases, high risks can be accounted for by implementing mandatory limitations (i.e., limitations that need to be accounted for regardless of the price), while lower risks can accounted for by implementing non-mandatory limitations whose compliance can be effected if the price for incorporating them is within an acceptable range. In some embodiments compliance with non-mandatory limitations indicating very low can be considered as "best effort" only.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes a processor 52, an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, or solid state drives (SSDs) which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

While the configuration in FIG. 1 shows storage controller 34 comprising four modules 36 and each of the modules coupled to four storage devices 50, a given storage controller 34 comprising any multiple of modules 36 coupled to any plurality of storage devices 50 is considered to be with the spirit and scope of the present invention.

Figure 2:
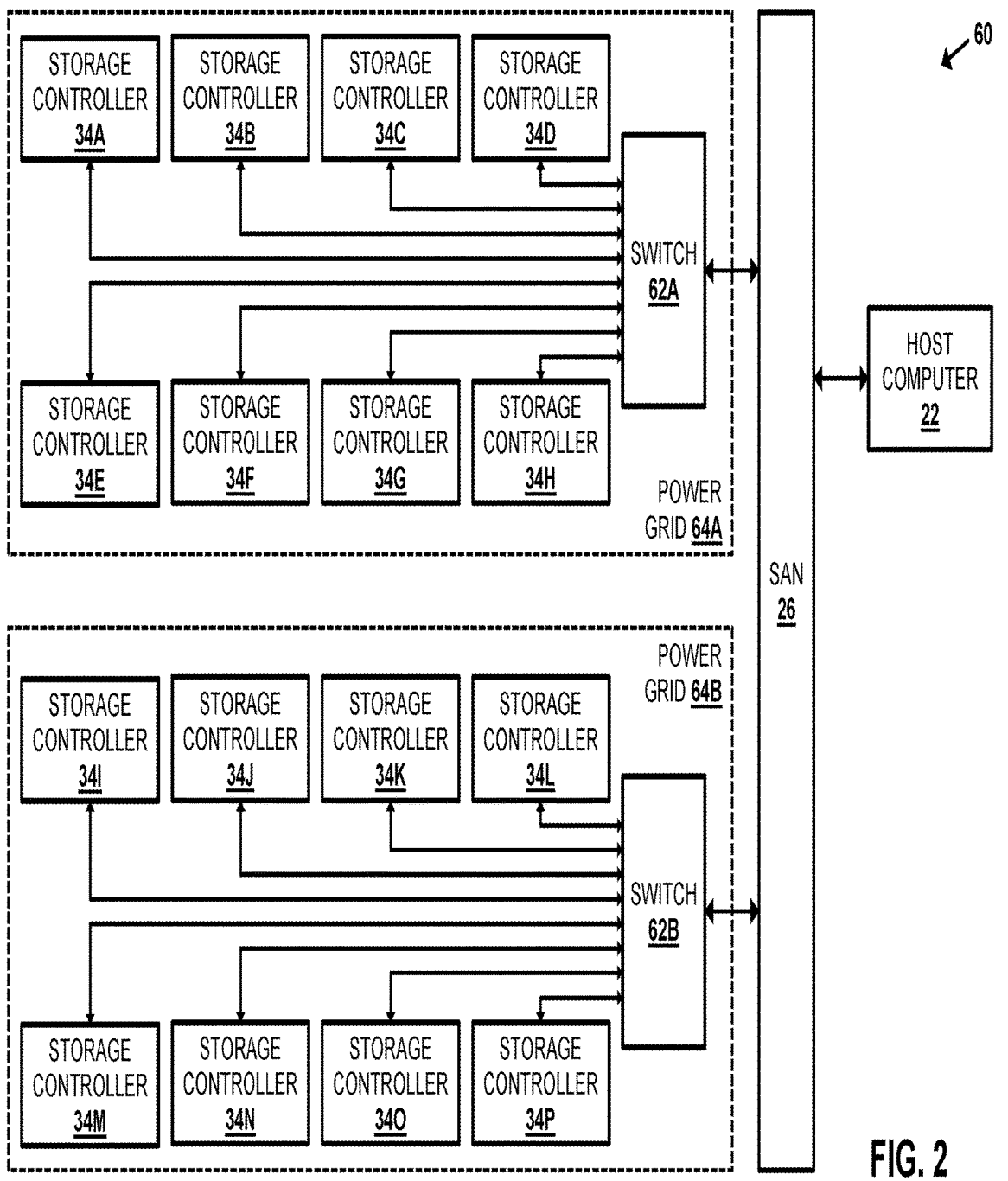
FIG. 2 is a block diagram that schematically illustrates a storage facility comprising a plurality of the storage controllers and configured to implement a software defined storage (SDS) system, in accordance with an embodiment of the present invention.

FIG. 2 is a block diagram that schematically illustrates a storage facility 60, in accordance with an embodiment of the present invention. Storage facility 60 comprises clustered storage controllers 34, network switches 62 and power grids 64. In FIG. 2, clustered storage controllers 34 are differentiated by appending a letter to the identifying numeral, so that the storage controller comprise storage clustered controllers 34A-34P, network switches 62 are differentiated by appending a letter to the identifying numeral, so that the network switches comprise network switches 62A and 62B, and power grids 64 are differentiated by appending a letter to the identifying numeral, so that the power grids comprise power grids 64A and 64B.

In the configuration shown in FIG. 2, clustered storage controllers 34A-34H are coupled to SAN 26 via network switch 62A, and clustered storage controllers 341-34P are coupled to the SAN via network switch 62B. Additionally, clustered storage controllers 34A-34H and network switch 62A are powered by power grid 64A, and clustered storage controllers 341-34P and network switch 62B are powered by power grid 64B.

Figure 3:
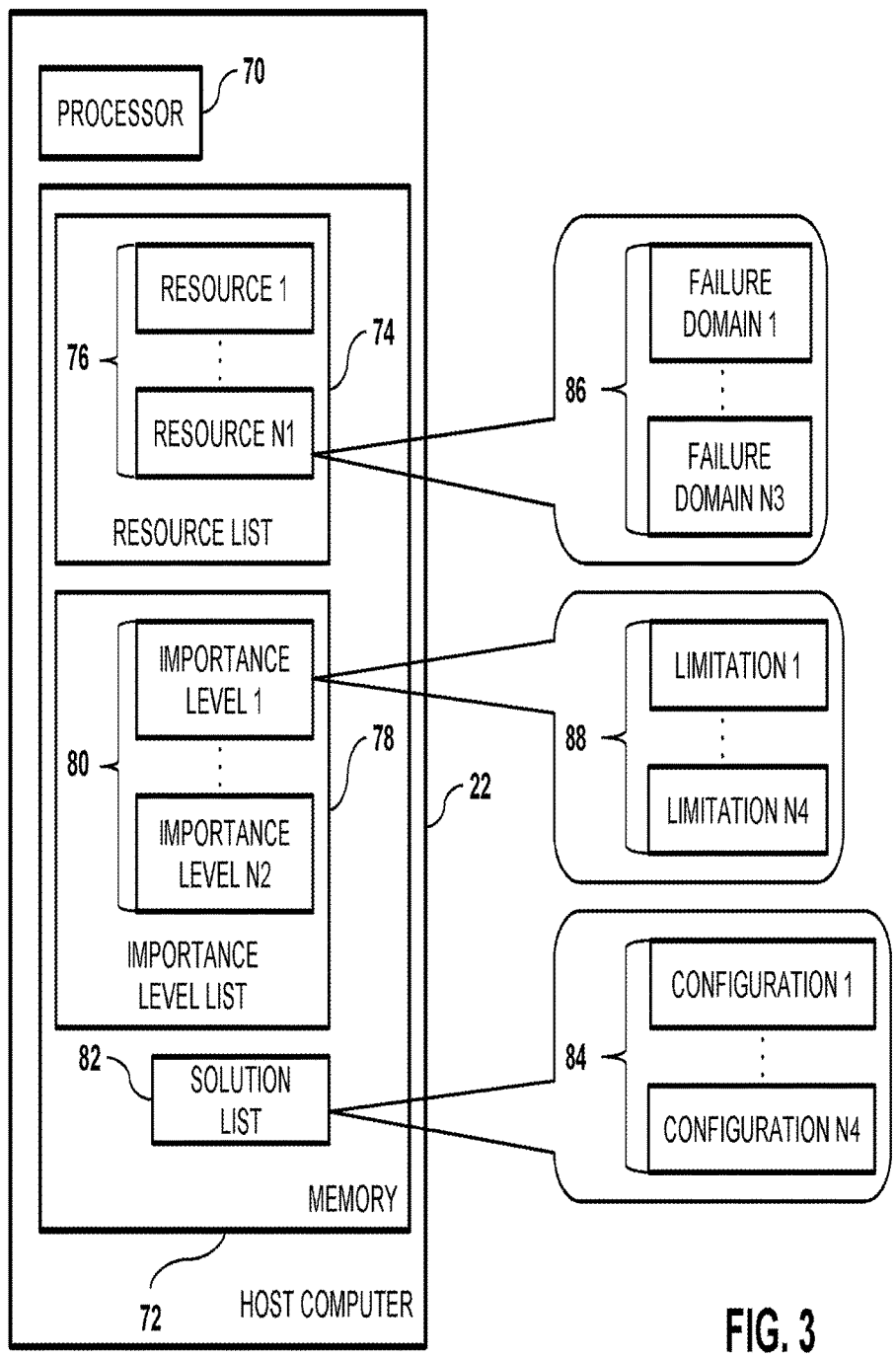
FIG. 3 is a block diagram that schematically illustrates a given host computer arranged to configure a data distribution in the SDS system, in accordance with an embodiment of the present invention.

FIG. 3 is a block diagram that schematically illustrates a given host computer 22 arranged to configure data distribution for an SDS system, in accordance with a first embodiment of the present invention. The given host computer 22 comprises a host processor 70, and a host memory 72 that stores a resource list 74 comprising multiple resources 76, an importance level list 78 comprising one or more importance levels 80, and a solution list 82 comprising one or more data distribution configurations 84 that processor 70 identifies using embodiments described herein.

Each resource 76 comprises a set of one or more storage devices 50 and is associated with one or more failure domains 86. Failure domains 86 may comprise either physical failure domains or logical failure domains.

Physical failure domains are typically based on hardware failure points. For example, if each module 36 has its own power supply (not shown), then each set of storage devices 50 on each of the modules comprise respective hardware failure domains. Additional examples of hardware failure domains comprise clustered storage controllers 34A-34H and storage controllers 341-34P. Clustered storage controllers 34A-34H comprise a hardware failure domain since they will not be available in the event of a failure of either network switch 62A or power grid 64A. Likewise, clustered storage controllers 341-34P comprise a hardware failure domain since they will not be available in the event of a failure of either network switch 62B or power grid 64.

Logical failure domains are typically on software failure points. For example, if network switches 42A and 42B are from the same vendor and execute the same software, then clustered storage controllers 34A-34P comprise a logical failure domain since they will not be available in the event of a bug in the software executing on both of the network switches.

Each importance level 80 is associated with one or more limitations 88. Each limitation 88 comprises a condition that is checked when configuring distributed storage for an SDS system, and each importance level 80 indicates a severity of not satisfying the condition when configuring the distributed storage. Typically, the importance levels need to include a mandatory importance level comprising limitations 88 that need to be met in order to configure the distributed storage for the SDS system.

In the following example, there are three importance levels 80 comprising, in order of importance, (a) "mandatory" (the most important), (b) "non-mandatory", and (c) a "recommendations" (the least important):

Mandatory. In the mandatory importance level, any data distribution configurations 84 must comply with the respective limitations 88 in order for the configuration to be considered legal. An example of a given limitation 88 for the mandatory importance level may comprise allocating a maximum of one storage device 50 from a given module 36 to a distributed storage system. This is because each module 36 typically has a single power supply, and a loss of the power supply results in a loss of all of the storage devices (also referred to herein as a set of the storage devices) in the given module.

Non-mandatory. Data distribution configurations (i.e., solutions) 84 "should" (i.e., do not need to) comply with limitations 80 associated with the non-mandatory importance level. If possible, processor 70 can define a given data distribution configuration 84 that meets all non-mandatory limitations 80. However, if no data distribution configuration 84 can be identify that meets all non-mandatory limitations 80 (or their impact on available capacity exceeds a given threshold), processor 70 can define a given data distribution configuration 84 that meets all the non-mandatory limitations, and flag (i.e., issue a warning for) the given data distribution configuration. An example of a given non-mandatory limitation 80 may comprise having a specified maximum number of storage devices 50 coupled to the same power grid 64.

Recommendations. When defining given data distribution configuration 84 processor 70 can try to minimize recommendation limitations 80 that are not met. A given recommendation limitation 80 may comprise a specifying a maximum number of storage devices 50 in a logical failure domain. For example, in storage facility 60 shown in FIG. 2, if network switches 62 are from the same vendor and execute the same software, all the storage devices in storage facility 60 are in the same logical failure domain. In this case, processor 7 can define a given data distribution configuration 84 using a number of storage devices 50 that is greater than the specified maximum number, and flag the given data distribution configuration 84 with a warning.

Processors 52 and 70 comprise general-purpose central processing units (CPU) or special-purpose embedded processors, which are programmed in software or firmware to carry out the functions described herein. The software may be downloaded to modules 36 and the given host computer 22 in electronic form, over a network, for example, or it may be provided on non-transitory tangible media, such as optical, magnetic or electronic memory media. Alternatively, some or all of the functions of processors 52 and 70 may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

SDS System Data Distribution Configuration

Figure 4:
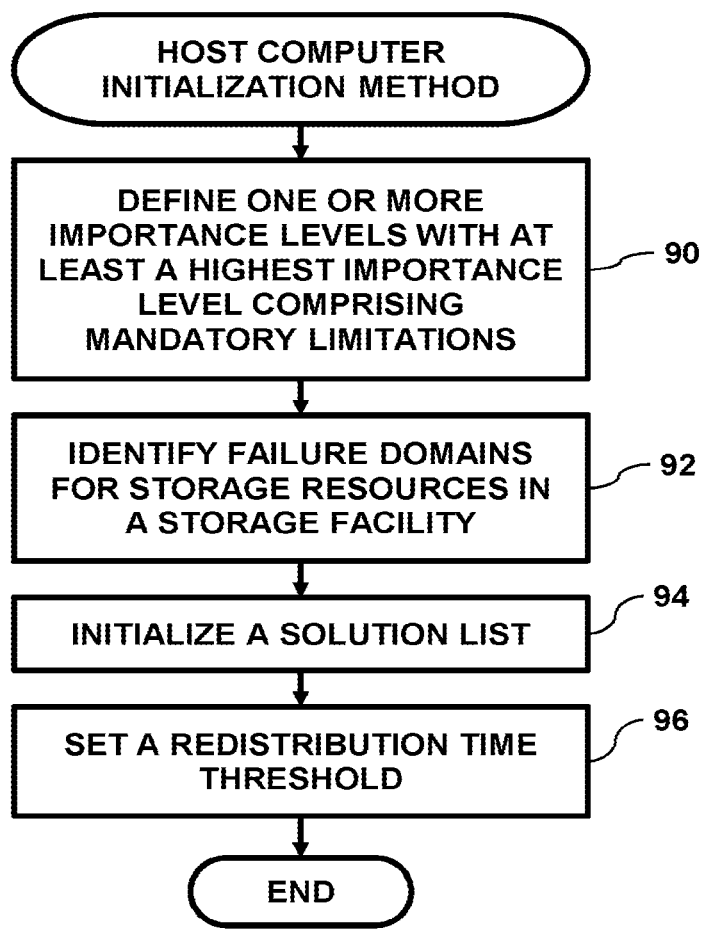
FIG. 4 is a flow diagram that schematically illustrates a method of initializing the host computer, in accordance with an embodiment of the preset invention

FIG. 4 is a flow diagram that schematically illustrates a method of initializing a given host computer 22 in order to enable the given host to configure data distribution for an SDS system, in accordance with an embodiment of the present invention. In a definition step 90, processor 70 defines one or more importance levels 80. If there is one importance levels 80, then all limitations 88 comprise mandatory limitations, and if there are more than one importance levels 80, then the highest importance level comprises mandatory limitations 88, and the remaining importance levels comprise non-mandatory (or recommended) limitations 88.

In an identification step 92, processor 70 identifies failure domains 86 for storage resources (e.g., storage devices 50) in storage facility 60, and in an initialization step 94, the host processor initializes solution list 82. As described supra, each failure domain 86 may comprise either a physical failure domain of a logical failure domain. Finally, in a set step 96, processor 70 sets a data redistribution time threshold, and the method ends. The data redistribution time threshold is described in the description referencing FIG. 5 hereinbelow.

Figure 5:
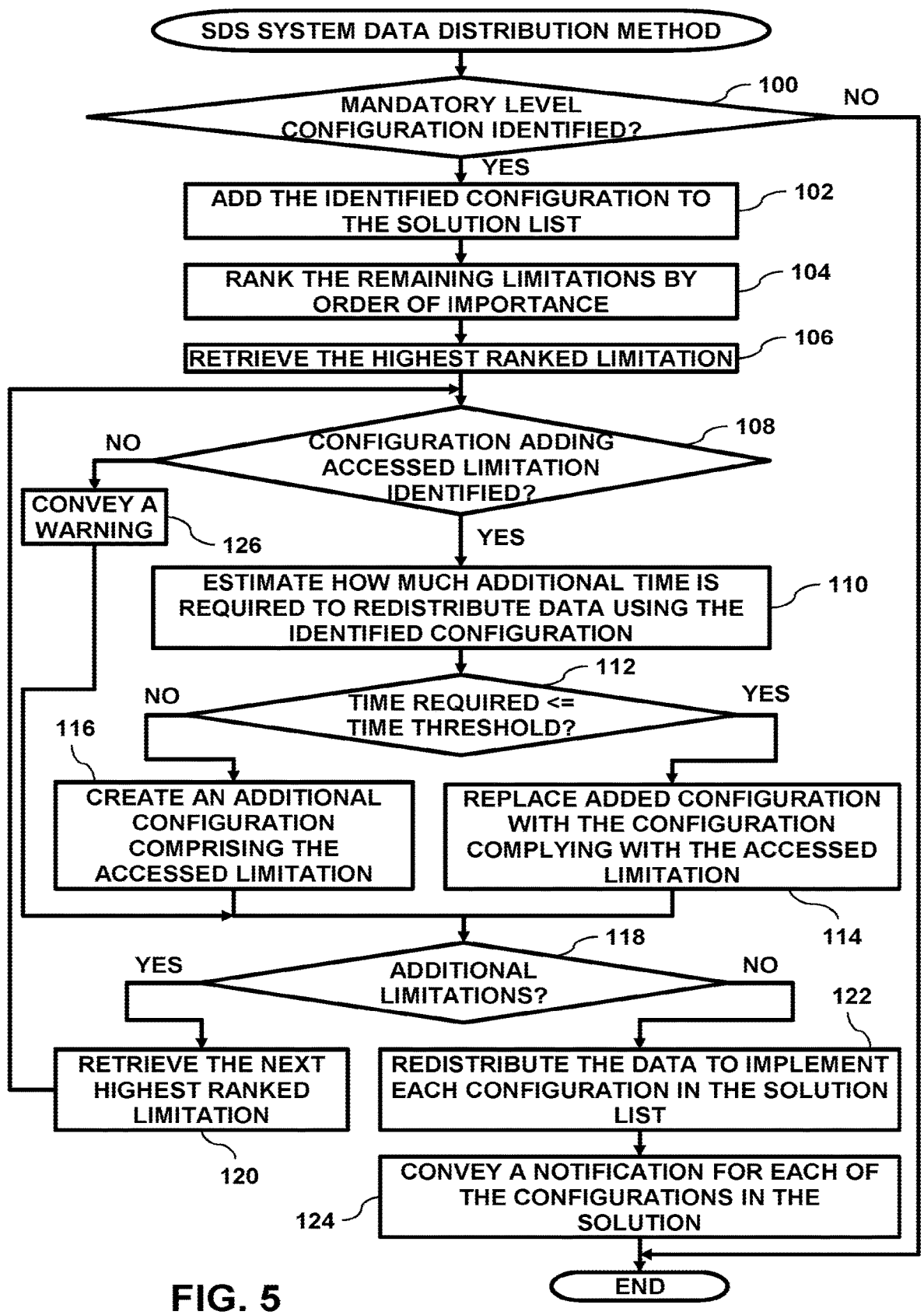
FIG. 5 is a flow diagram that schematically illustrates a method of configuring the data distribution in the SDS system, in accordance with an embodiment of the preset invention.

FIG. 5 is a flow diagram that schematically illustrates a method of configuring data distribution in the SDS system, in accordance with an embodiment of the preset invention. In a first comparison step 100, if a data distribution configuration 84 cannot be identified that complies with all limitations 88 for the mandatory importance level, then the method ends.

If (i.e., in step 100) a data distribution configuration 84 is identified that complies with all limitations 88 for the mandatory importance level then in an addition step 102, processor 70 adds the identified configuration (i.e., a "current configuration") to solution list 82, and the limitations for the mandatory importance level comprise "current limitations". In a ranking step 104, processor 70 ranks (i.e., sorts) all limitations 88 in order of importance. For example, if there are "non-mandatory" and "recommended" importance levels 80, then processor 70 ranks the limitations for the non-mandatory importance level higher than the limitations for the recommended importance level.

In a first retrieve step 106, processor 70 retrieves the highest ranked limitation 88. In a second comparison step 108, if processor 70 identifies a data distribution configuration 84 that complies with the accessed limitation 88 added to the current limitation, then in an estimation step 110, the host processor estimates how much additional time (i.e., compared to the current configuration) will be required to redistribute data in the SDS system.

In a third comparison step 112, if the estimated required time is less than or equal to the redistribution time threshold (set in step 96 in the flow diagram shown in FIG. 4), then in a replacement step 114, processor 70 replaces the most recently added data distribution configuration 84 (i.e., the "current configuration") in solution list 82 with a data distribution configuration 84 that adds the retrieved limitation 88 (i.e., to the current configuration). Returning to step 112, if the estimated required time is greater than the redistribution time threshold, then in a definition step 116, processor 70 a defines a new data distribution configuration that complies with the current limitations and the accessed limitation, adds the accessed limitation to the current limitation, and sets the current configuration the new data distribution configuration.

In a fourth comparison step 118, if there are any additional limitations 88, then in a second access step 120, processor 70 access the next (i.e., highest ranked) limitation 88, and the method continues with step 108. Returning to step 118, if there are no additional limitations 88, then in a redistribution step 122, processor 70 redistributes the SDS system data to implement each data distribution configuration 84 in solution list 82.

Finally, in a notification step 124, processor 70 conveys, to a user, a notification for each of the data distribution configurations in solution list 82, and the method ends. Returning to step 108, if processor 70 fails to identify a data distribution configuration 84 that complies with the accessed limitation 88 added to the current limitation, then the method continues with step 118.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
defining a plurality of failure domains for sets of storage devices in a storage facility;
defining, using the failure domains, one or more limitations for distributing data on the storage devices; wherein the one or more limitations are defined within a plurality of layers arranged in a hierarchal order of importance such that one or more limitations defined in a higher one of the plurality of layers represents one or more mandatory limitations and one or more limitations defined in a lower one of the plurality of layers represents one or more non-mandatory limitations;
identifying a data distribution configuration for a software defined storage system that is compliant with the one or more limitations according to the plurality of layers arranged in the hierarchal order of importance such that a prospective manner in which the data is distributed on the storage devices is determined that conforms to the defined one or more limitations and complies with the defined failure domains; wherein the identifying further includes considering forfeiting an implementation of the one or more non-mandatory limitations which are not able to be met when implementing the one or more mandatory limitations commensurate with complying with the defined failure domains; and
distributing the data among the storage devices to implement the identified data distribution configuration according to the one or more limitations defined using the failure domains.

2. The method according to claim 1, wherein each of the failure domains is selected from a group consisting of a physical failure domain and a logical failure domain.

3. The method according to claim 1, wherein the data distribution configuration comprises a first data distribution configuration, and comprising identifying a second data distribution configuration that is compliant with the one or more mandatory limitations and the one or more non-mandatory limitations, and presenting the second data distribution configuration to a user.

4. The method according to claim 1, wherein the data distribution configuration comprises a first data distribution configuration, and comprising identifying a second data distribution configuration that is compliant with the one or more mandatory limitations and is not compliant with at least one of the one or more non-mandatory limitations, and presenting the second data distribution configuration to a user.

5. The method according to claim 4, and comprising presenting the at least one of the one or more non-mandatory limitations to the user.

6. An apparatus, comprising:
a memory; and
a processor configured:
to define a plurality of failure domains for sets of storage devices in a storage facility;
to define, in the memory using the failure domains, one or more limitations for distributing data on the storage devices; wherein the one or more limitations are defined within a plurality of layers arranged in a hierarchal order of importance such that one or more limitations defined in a higher one of the plurality of layers represents one or more mandatory limitations and one or more limitations defined in a lower one of the plurality of layers represents one or more non-mandatory limitations;
to identify a data distribution configuration for a software defined storage system that is compliant with the one or more limitations according to the plurality of layers arranged in the hierarchal order of importance such that a prospective manner in which the data is distributed on the storage devices is determined that conforms to the defined one or more limitations and complies with the defined failure domains; wherein the identifying further includes considering forfeiting an implementation of the one or more non-mandatory limitations which are not able to be met when implementing the one or more mandatory limitations commensurate with complying with the defined failure domains; and
to distribute the data among the storage devices to implement the identified data distribution configuration according to the one or more limitations defined using the failure domains.

7. The apparatus according to claim 6, wherein each of the failure domains is selected from a group consisting of a physical failure domain and a logical failure domain.

8. The apparatus according to claim 6, wherein the data distribution configuration comprises a first data distribution configuration, and wherein the processor is configured to identify a second data distribution configuration that is compliant with the one or more mandatory limitations and the one or more non-mandatory limitations, and to present the second data distribution configuration to a user.

9. The apparatus according to claim 6, wherein the data distribution configuration comprises a first data distribution configuration, and wherein the processor is configured to identify a second data distribution configuration that is compliant with the one or more mandatory limitations and is not compliant with at least one of the one or more non-mandatory limitations, and to present the second data distribution configuration to a user.

10. The apparatus according to claim 9, and wherein the processor is configured to present the at least one of the one or more non-mandatory limitations to the user.

11. A computer program product, the computer program product comprising:
a non-transitory computer readable storage medium having computer readable program code embodied therewith, the computer readable program code comprising:
computer readable program code configured to define a plurality of failure domains for sets of storage devices in a storage facility;
computer readable program code configured to define, using the failure domains, one or more limitations for distributing data on the storage devices; wherein the one or more limitations are defined within a plurality of layers arranged in a hierarchal order of importance such that one or more limitations defined in a higher one of the plurality of layers represents one or more mandatory limitations and one or more limitations defined in a lower one of the plurality of layers represents one or more non-mandatory limitations;
computer readable program code configured to identify a data distribution configuration for a software defined storage system that is compliant with the one or more limitations according to the plurality of layers arranged in the hierarchal order of importance such that a prospective manner in which the data is distributed on the storage devices is determined that conforms to the defined one or more limitations and complies with the defined failure domains; wherein the identifying further includes considering forfeiting an implementation of the one or more non-mandatory limitations which are not able to be met when implementing the one or more mandatory limitations commensurate with complying with the defined failure domains; and
computer readable program code configured to distribute the data among the storage devices to implement the identified data distribution configuration according to the one or more limitations defined using the failure domains.

12. The computer program product according to claim 11, wherein each of the failure domains is selected from a group consisting of a physical failure domain and a logical failure domain.

13. The computer program product according to claim 11, wherein the data distribution configuration comprises a first data distribution configuration, and comprising computer readable program code configured to identify a second data distribution configuration that is compliant with the one or more mandatory limitations and the one or more non-mandatory limitations, and to present the second data distribution configuration to a user.

14. The computer program product according to claim 11, wherein the data distribution configuration comprises a first data distribution configuration, and comprising computer readable program code configured to identify a second data distribution configuration that is compliant with the one or more mandatory limitations and is not compliant with at least one of the one or more non-mandatory limitations, and to present, to a user, the second data distribution configuration and the at least one of the one or more non-mandatory limitations.

* * * * *